April 18, 1933.　　　J. H. MEACOCK　　　1,904,068
CONVEYER, ESCALATOR, AND THE LIKE
Filed March 15, 1932
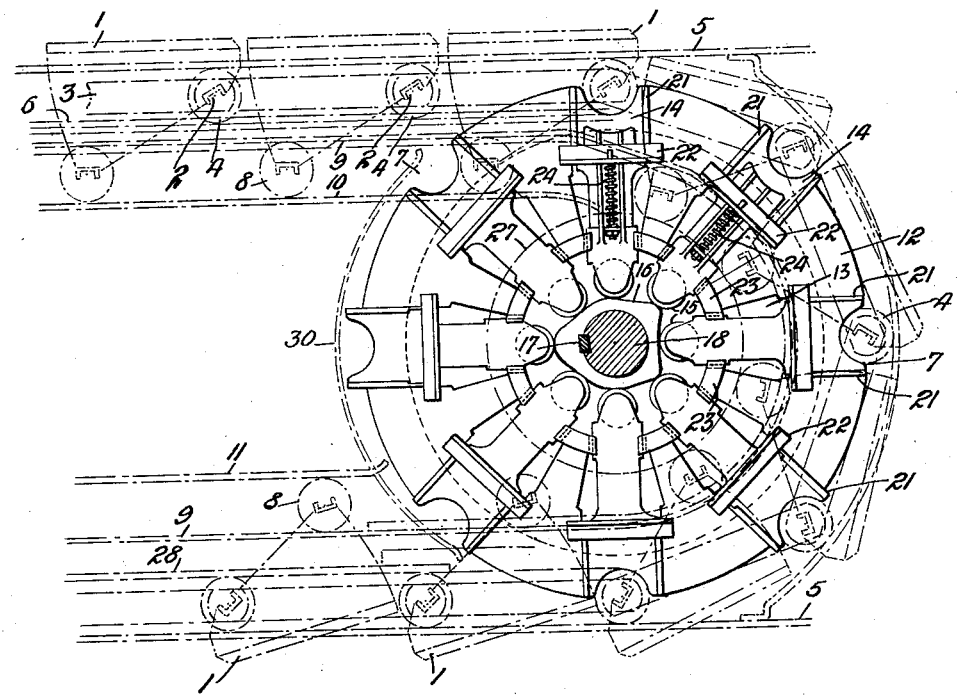
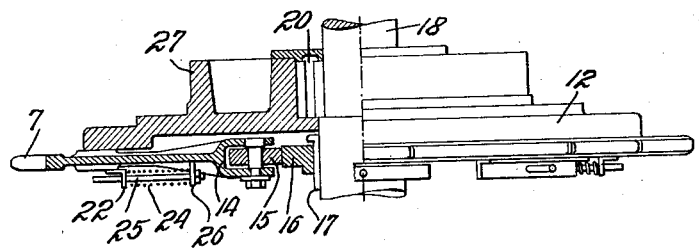
INVENTOR
John H. Meacock
BY
ATTORNEY Patented Apr. 18, 1933

1,904,068

UNITED STATES PATENT OFFICE

JOHN HARPER MEACOCK, OF NORTHAMPTON, ENGLAND

CONVEYER, ESCALATOR, AND THE LIKE

Application filed March 15, 1932, Serial No. 598,914, and in Great Britain March 5, 1931.

This invention relates to conveyers, escalators, and the like apparatus of the kind in which the effective rigid pitch between joints of the driving chain or chains for the steps, buckets, or the like, is determined by the spacing between the said steps, buckets, or the like. In such apparatus the pitch of the driving chain is usually comparatively large, and if the chain is to be driven by a driving sprocket wheel running at constant velocity and engaging the said joints of the chain then the number of teeth demanded on the driving sprocket wheel to ensure even an approximately unvarying velocity of the steps, buckets, or the like, is so great as to render the driving sprocket wheel impracticable from a consideration of size. The object of the invention is to overcome the above difficulty.

In a sprocket wheel for use with apparatus of the kind specified, according to the present invention, the tooth spaces engaging the joints of the driving chain are movable with relation to the main revolving body of the wheel whereby, when the wheel is rotating with constant angular velocity, the velocity of the driving chain before engagement with and/or after disengagement from the wheel is rendered constant or more nearly constant than in the case of a similarly sized wheel having the same number of fixed tooth spaces.

Means may be provided for increasing the distance between a tooth space and the centre of rotation of the wheel during the interval between the engagement of the said tooth space with a joint of the chain and the engagement of the next tooth space with the next joint of the chain. Furthermore during the interval between the disengagement of a tooth space from a joint of the chain and the disengagement of the next tooth space from the next joint of the chain the distance between the said next tooth space and the centre of rotation of the wheel is decreased. When a link of the chain is in engagement with the wheel the tooth spaces engaging the joints at the ends of the link may be adapted to move in such a manner as to accommodate the link on the wheel.

The tooth spaces may be on members adapted to move relatively to the said main revolving body, parts of the said members engaging a fixed cam whereby movements of the said members are effected. Preferably the said members are adapted to slide in radial slots in the main revolving body, the inner ends of the members engaging the fixed cam. The members may also be adapted to be moved relatively to the main rotating body whilst their tooth spaces are not in engagement with the chain.

The invention will now be described, by way of example, with reference to the accompanying drawing of a driving sprocket wheel for an escalator, the chain and the steps carried thereby being shown in chain dotted line. Figure 1 is a side elevation in which only two of the radial sliding members are shown in detail and Figure 2 is a plan of the sprocket wheel in half section.

As shown each step 1 is pivotally connected at 2 to a chain 3 comprising a plurality of links jointed at 2, the pitch of the chain being determined by the spacing between the steps 1. Each pivotal point 2 is provided with a roller 4 which is adapted to run between an outer guide rail 5 and a top inner guide rail 6 or bottom inner guide rail 28 and to engage tooth spaces 7 on the sprocket wheel. Each step 1 is also provided with a roller 8 which is adapted to run between an outer guide rail 9 and a top inner guide rail 10 or a bottom inner guide rail 11.

The sprocket wheel comprises a main revolving body 12 pivotally mounted on roller bearings 20 on a fixed shaft 18 and formed with eight radial slots or channels 13. Adapted to slide within each channel 13 is a member 14 formed at its outer end with a tooth space 7 and provided at its inner end with a roller 15, adapted to engage a fixed cam 16 secured by a key 17 to the fixed shaft 18. The sides of the outer end of the members 14 are provided with bronze strips 21 which are filed up after fixing to fit flush with the sides of the channels 13. Each member 14 is retained within the channel 13 by means of a cross angle iron 22 secured to the body 12 and by members 23 also secured to the body 12. Each roller 15 is maintained in contact with the cam 16 by means of a helical compression spring 24 arranged on a spindle 25, which is secured to a flange 26 projecting from the member 14 and is free to slide through a hole in the flange of the angle iron 22.

In operation the sprocket wheel is driven with constant angular velocity from an electric motor by a chain of small pitch, which engages a chain wheel (not shown) secured to the body 12. As the wheel rotates so a roller 4 of the chain 3 at the top runs along the top horizontal portion of the guide rails 5 and 6 until it engages the top tooth space 7. If the distance between the tooth space 7 and shaft 18 were maintained constant, as in the usual type of sprocket wheel having fixed tooth spaces, then the horizontal velocity of the chain would decrease during the next eighth of a revolution of the wheel. But it will be seen that in the sprocket wheel shown, as the wheel rotates through one eighth of a revolution, the roller 15 of the top member rides along the fixed cam 16 and so increases the distance between the tooth space 7 and the shaft 18. The cam is so shaped that this increase in distance between the tooth space 7 and the shaft 18 is such as to ensure a substantially horizontal velocity of the chain until the next roller 4 engages the next tooth space 7. The horizontal velocity of the chain prior to engagement with the sprocket wheel is thus maintained substantially constant.

When the wheel has performed one eighth of a revolution and a link is brought into engagement with the wheel, it is desirable that the link should be accommodated on the wheel between two tooth spaces 7 during the next three eighths of a revolution. For this purpose it will be seen that during the next three eighths of a revolution the roller 15 of the member 14 engaging the leading roller 4 of the link in question, rides over the cam 16 so as first to decrease the distance between the tooth space 7 and the shaft 18 to its original value, and then to increase the distance to its previous maximum value, and finally again to decrease the distance to its original value.

During the next eighth of a revolution the link is disengaged from the wheel, the leading roller 4 engaging the guide rails 28 and 5. It will be seen that the tooth 7 engaging the rear roller 4 of the link is at its maximum distance from the shaft 18, and as the wheel rotates to disengage the link from the wheel so the distance is decreased to its original value. Thus it is ensured that the horizontal velocity of the chain between the guide rails 28 and 5 is substantially constant and equal to the horizontal velocity of the chain between the guide rails 5 and 6.

While a link is travelling round the wheel, the roller 8 of the step pivoted to that link is directed by the guide rail 10 onto a flange 27 of the body 12, along which it runs until at the bottom it is directed between the guide rails 11 and 9.

There is no necessity for any radial motion of the member 14 relatively to the body 12 during the period of disengagement from the chain, but, as shown, the cam 16 is so shaped as to move the members 14 outward into a pan or shield 30, shown in dot and dash lines in Fig. 1, during this period for the purpose of effecting lubrication.

I claim:—

1. Apparatus of the kind specified comprising a chain, a rotatable sprocket wheel for engaging the chain, a plurality of members movably mounted on the sprocket wheel and each provided with a tooth space for engaging joints of the chain and means rendered effective by rotation of the sprocket wheel for moving one of the said members away from the centre of rotation of the wheel during the interval between the engagement of the tooth space of that member with a joint of the chain and the engagement of the next tooth space with the next joint of the chain.

2. Apparatus of the kind specified comprising a chain, a rotatable sprocket wheel for engaging the chain, a plurality of members movably mounted on the sprocket wheel and each provided with a tooth space for engaging joints of the chain and means rendered effective by rotation of the sprocket wheel for moving one of the said members towards the centre of rotation of the wheel immediately prior to the disengagement of the tooth space of that member from a joint of the chain and while the tooth space is still in engagement with the joint.

3. Apparatus of the kind specified comprising a chain, a rotatable sprocket wheel for engaging the chain comprising a plurality of members slidably mounted in radial slots formed in the sprocket wheel and each provided with a tooth space for engaging joints of the chain, a cam fixed relative to the sprocket wheel for sliding the members outward and resilient means causing said members to follow the cam so that as the sprocket wheel rotates said members will slide in the slots away from and towards the center of rotation of the sprocket wheel.

4. Apparatus as claimed in claim 3, wherein the cam is formed with a part which effects outward movement of the members in their slots when their tooth spaces are not in engagement with joints of the chain for lubricating the engaging portions of the members and slots during this period.

JOHN HARPER MEACOCK.